3,308,095
FIBER-FORMING CONDENSATION POLYESTERS HAVING ENHANCED RESISTANCE TO PHOTODEGRADATION
Sidney B. Maerov, Kinston, N.C., assignor to E. I. du Pont de Nemours and Company, Wilmington, Del., a corporation of Delaware
No Drawing. Filed July 14, 1965, Ser. No. 472,038
4 Claims. (Cl. 260—47)

This application is a continuation-in-part of my pending application Serial No. 85,999, filed January 31, 1961, now abandoned.

This invention relates to the light stability of synthetic linear fiber-forming condensation polyesters which are free from ethylenic unsaturation. More particularly, it is concerned with condensation polymerization of bifunctional ester-forming monomers with a novel ester-forming component to form synthetic linear fiber-forming condensation polyesters having enhanced ultraviolet light stability; and to synthetic linear fiber-forming copolyesters containing the novel component.

Synthetic linear fiber-forming condensation polyesters have high commercial interest for textile uses owing to their high tenacity, flexibility, toughness, low moisture absorption, and other valuable properties. Many variations in polyester compositions are known and methods for their preparation have been adequately disclosed, e.g., United States Patent Nos. 2,465,319, 2,465,150, 2,595,343, 2,901,466, 2,035,578, 2,708,617, and Belgium 563,173. The fiber-forming polyesters are prepared from bifunctional ester-forming monomers which are free from ethylenic unsaturation. Although aliphatically unsaturated polyesters are prepared for other purposes, useful fibers cannot be prepared from them. The two types of polyesters have properties which are completely non-analogous.

In common with many organic materials, especially synthetic polymers, polyesters undergo degradation when exposed to light. This degradation is manifested in a loss of strength and in a reduction of molecular chain length in some classes of polyesters. In other classes of polyesters the degradation is particularly evident in a discoloration or yellowing of the polymer. Although different species of polyesters exhibit somewhat different resistance to sunlight degradation, it is generally true that an improved resistance to such degradation is desirable for all polyesters in some end uses. Furthermore, some species of polyesters have been completely eliminated from some commercial uses because of poor light stability. An important example of the latter is the polyester of diphenylolpropane and isophthalic acid which might be made into an excellent textile fiber were it not for the rapid discoloration encountered upon exposure to ultraviolet light.

Attempts to improve the resistance of polyester fibers to photochemical degradation have been made by coating the fibers with, or incorporating into the fibers by a dyeing procedure, an organic compound which has the power to absorb ultraviolet light rays. Although some degree of success has been achieved, the procedures described in the prior art have not been wholly satisfactory. A particularly unsatisfactory feature has been the poor abrasion resistance of ultraviolet absorbing coatings on fibers, and the poor washfastness of ultraviolet absorbing compounds which have been dyed into the polyester fibers. Thus, for example, polyester textile fibers protected from ultraviolet light by prior art processes are found to rapidly lose their protection when subjected to normal use conditions consisting of repeated wearing, washing and ironing or dry cleaning.

It is an object of this invention to provide synthetic linear fiber-forming condensation polyesters which have enhanced resistance to photodegradation. Another object is to provide synthetic linear condensation polyesters in the form of fibers, particularly staple or continuous filaments for textile use, which are resistant to discoloration or loss of strength upon exposure to ultraviolet light. A further object is to provide a process for the production of a synthetic linear fiber-forming condensation polyester from which fibers having a high resistance to ultraviolet light degradation can be prepared. Other objects will become apparent from the following description and claims.

In accordance with the present invention, it has been found that linear condensation polyesters which provide fibers having enhanced resistance to photodegradation can be prepared by the polycondensation of bifunctional ester-forming monomers free of ethylenic unsaturation, wherein a minor proportion of the monomers are compounds which exhibit a strong absorption for electromagnetic radiation having a wavelength in the range 290–390 millimicrons, but little or no absorption in the range 400–800 millimicrons. The product of this invention is accordingly a fiber-forming synthetic linear condensation copolyester containing in the polymer molecule a repeating organic radical capable of absorbing electromagnetic radiation in the wavelength range 290–390 millimicrons and which is transparent in the visible region of the spectrum. The polyester product forms textile fibers which are particularly characterized by a marked improvement in resistance to ultraviolet degradation, which improvement is washfast, sublimation-fast, and abrasion-proof. Surprisingly, the improvement obtained is considerably greater than that given by an equivalent quantity of the same ultraviolet absorbing agent when coated on the surface of the polyester or when dispersed in the polyester by a solution procedure. Preferably, the polyester contains from about 0.1–10 mol percent of the ultraviolet absorbing units, based upon the number of ester linkages present in the polyester. In preferred embodiments of the invention, the ultraviolet-absorbing ester-linking unit contains a 2-hydroxybenzophenone nucleus, or an N-substituted benzotriazole nucleus. These preferred embodiments are remarkably stable to melting temperatures used to form polyesters into shaped structures.

The radical in the polyester chain which carries the ultraviolet absorbing unit may be attached to the polyester chain by 1,2, or even more ester linkages, but 2 are preferred. It will be recognized that the radical will act as a crosslinking agent if it is attached to the polymer molecule by more than two ester linkages. When it is desired to extrude the polymer into yarn, radicals capable of being attached to the polymer molecule by more than two ester linkages will usually be avoided.

Unexpectedly, it has been found that an hydroxyl group located ortho to the carbonyl group of a benzophenone nucleus is relatively inactive toward esterification. Thus, under the conditions used for polyesterification the 4-hydroxyl group of 2,4-dihydroxybenzophenone will undergo esterification at a much faster rate than will the 2-hydroxyl group. In the compound 2,4,4'-trihydroxybenzophenone, the 4- and 4'- hydroxyls undergo esterification at a much more rapid rate than does the 2-hydroxyl group. In the compound 2,2',4-trihydroxybenzophenone, the 4-hydroxyl group esterifies most rapidly; under polymerization conditions, only one of the residual 2- and 2'- hydroxyls may then be esterified so that difunctionality is maintained in the polymer system and at least one free orthohydroxybenzophenone group remains to act as an ultraviolet absorbing center.

The term "ester-forming group," as used herein, refers o either of the complementary radicals, hydroxycarbonyl and hydroxyl

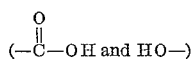

both aliphatic and phenolic in type, which react with the elimination of water to form a carbonyloxy ester radical

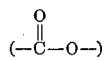

The term also includes functional groups equivalent to the hydroxyl group, such as epoxides or esters, particularly the acetate ester or esters of other aliphatic acids having relatively few carbon atoms, as well as functional groups equivalent to the hydroxy carbonyl group, such as carbonyl halides, anhydrides, salts, and esters with the lower alcohols. Similarly, compounds containing ester-forming groups are designated as "ester-forming compounds." Of course each of the complementary hydroxycarbonyl and hydroxyl radicals, or functional groups derived from them, must be present in the reaction mixture for polycondensation to proceed; and any excess of one of the complementary groups with respect to the other is removed during the reaction, usually by volatilization of compounds containing such groups. Glycol esters (hydroxyalkyl esters) of dicarboxylic acids may function in either capacity as ester-forming compounds and thereby function as intermediates from which polycondensation can be initiated directly.

The term "synthetic linear fiber-forming condensation polyester," as used herein, refers to a substantially linear polymer of fiber-forming molecular weight comprising a series of predominantly carbon atom chains, free of ethylenic unsaturation, joined by recurring divalent ester radicals, each of said ester radicals comprising a carbonyl group attached on at least one side to an oxygen atom. The divalent ester radicals may be represented by the general formula

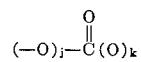

where $j$ and $k$ are 0 or 1 and $j+k=1$ or 2. As used herein, the term "polyester" is intended to include copolyesters, terpolyesters, and the like. Typical synthetic linear condensation polyesters comprehended by this definition are given below. In the formulas, $x$ and $x'$ represent numbers sufficiently large that the polyesters are of fiber-forming molecular weight, i.e., having an inherent viscosity of at least about 0.25.

FORMULA A

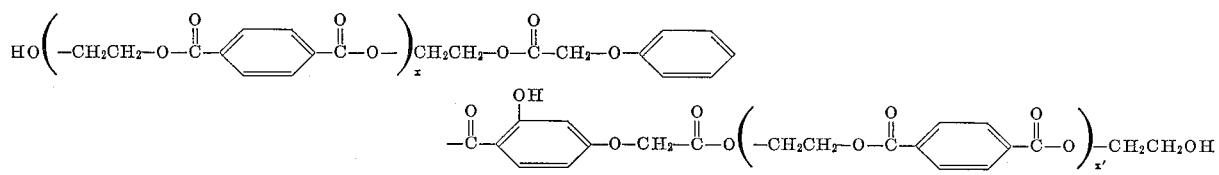

FORMULA B

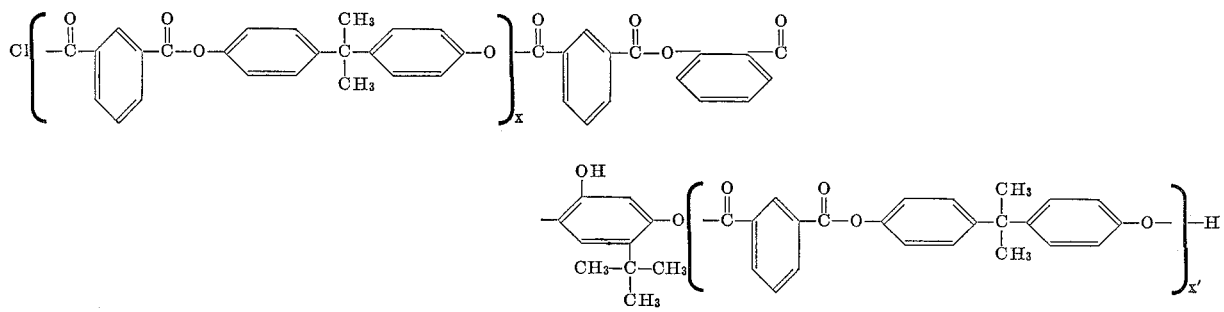

FORMULA C

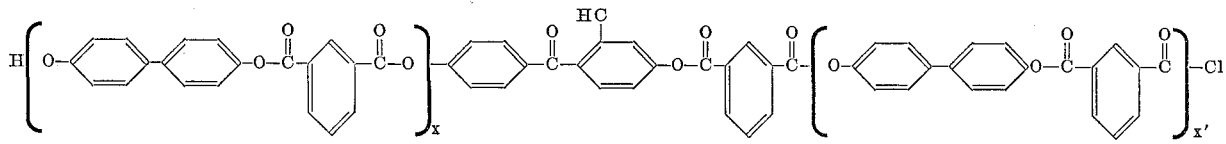

FORMULA D

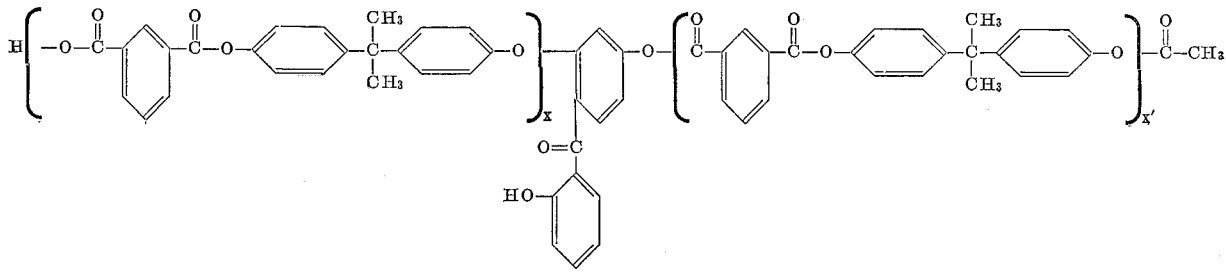

FORMULA E

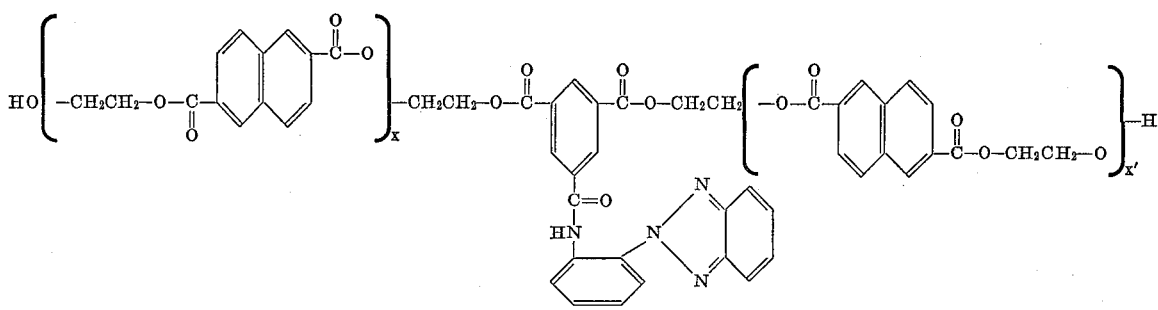

FORMULA F

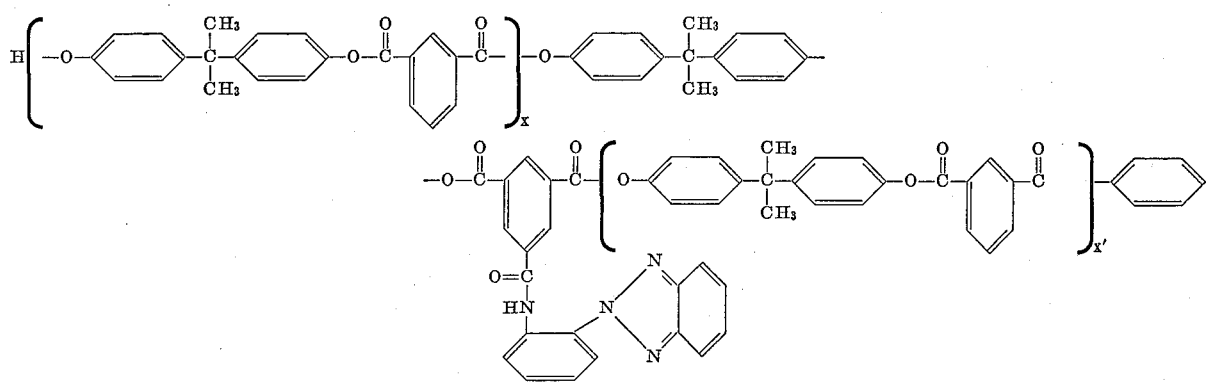

Formula A represents a polyester derived from ethylene glycol and a mixture of terephthalic acid and 2-hydroxy - 4,4'-dicarboxymethoxybenzophenone. This polyester is an example of the case in which successive ester linkages, i.e., the carbonyloxy radicals, in the polyester chain are oriented in opposite directions, so that the ethylene radicals are attached at each end to the oxygen atoms of the ester linkages and the phenylene (or substituted phenylene) radicals are attached at each end to the carbon atoms of the ester linkages. In a typical instance, such a polyester may be prepared by reacting 0.99 mol of dimethyl terephthalate, 0.01 mol of 2-hydroxy-4,4'-dicarbomethoxymethoxybenzophenone and 2.1 mols of ethylene glycol at atmospheric pressure until the theoretical amount of methanol is recovered. Polymerization is continued under vacuum with stirring at 275° C. for three hours or until a melt spinnable viscosity is attained.

Formula B represents a polyester derived from diphenylolpropane and a mixture of isophthalic acid and 2,2',4-trihydroxy-5-tertiary butylbenzophenone. In a typical example, the polyester may be prepared by interfacial polymerization. A solution of 0.0475 mol of diphenylolpropane and 0.0025 mol of 2,2',4-trihydroxy-5-tertiary butylbenzophenone in 325 ml. of water containing 4.0 grams of sodium hydroxide and a dispersing agent was well stirred while 0.05 mol of isophthaloyl chloride in 1,1,2-trichloroethane was added rapidly. After fifteen minutes stirring, the high molecular weight polymer was precipitated in powder form by addition of acetone.

Formula C represents a polyester derived from p,p'-biphenol and a mixture of isophthalic acid and 2,4,4'-trihydroxybenzophenone. In a typical example, the polyester is prepared by interfacial polymerization in a manner similar to that described for Formula B.

Formula D represents a polyester derived from isophthalic acid and a mixture of diphenylolpropane and 2,2',4-trihydroxybenzophenone. This polyester may be made by a thin film acidolysis reaction in which polyesterification occurs by exchange between isophthalic acid and the diacetates of diphenylolpropane and 2,2',4-trihydroxybenzophenone with the elimination of acetic acid. Although Formula D represents polyesterification through the 2-and 4-hydroxyls of 2,2',4-trihydroxybenzophenone, the diacetate of this compound is actually a mixture of the isomeric 2,4- and the 2',4-diacetates. In this polymerization method, atmospheric pressure exchange is first used to remove about one-half of the theoretical acetic acid to reduce volatility. The resultant "monomer" is melt extruded onto a moving tape of aluminum or stainless steel as a thin film (0.1–1.0 mil thickness). The thin film is polymerized to high molecular weight polymer in an oven at 350° C., while swept by a stream of nitrogen, using holdup times of 60 to 120 seconds duration.

Formula E represents a polyester derived from ethylene glycol and a mixture of 2,6-naphthalic acid and 2(3',5' - dicarboxybenzamido-2-phenyl)benzotriazole. In a typical example, a mixture of 0.98 mol of dimethyl-2,6-naphthalate, 0.02 mol of 2(3',5'-dicarbomethoxybenzamido-2-phenyl)2,1,3-benzotriazole and 2.1 mols of ethylene glycol are exchanged and polymerized as described for Formula A above, except that vacuum polymerization is conducted at 285° C.

Formula F represents a polyester derived from 2,2-bis-(4-hydroxyphenyl)-propane and a mixture of isophthalic acid and 2(3',5'-dicarboxybenzamido-2-phenyl)-2,1,3-benzotriazole. Such as a copolymer may be made by "phenolysis" by reacting 2,2-bis-(4-hydroxyphenyl)-propane with the mixture of diphenyl esters of isophthalic acid and 2(3',5'-dicarboxybenzamido-2-phenyl)-2,1,3-benzotriazole in the presence of an alkali metal or an alkali metal acetate or an alkali metal hydride as an exchange catalyst. Polymerization occurs as the evolved phenol is removed from the melt in both atmospheric and vacuum exchange phases of the polymerization.

In a preferred embodiment of the invention, the fiber-forming polymer is a synthetic linear condensation polyester of bifunctional ester-forming compounds wherein at least about 75% of the repeating structural units of the polymer chain include at least one divalent carbocyclic ring containing at least six carbon atoms present as an integral part of the polymer chain and having a minimum of four carbon atoms between the points of attachment of the ring in the polymer chain (para-relationship in the case of a single 6-membered ring). The polyesters may be derived from any suitable combination of bifunctional ester-forming compounds. Such compounds include hyroxy acids such as 4-(2-hydroxyethyl)benzoic acid and -(2-hydroxyethoxy)-benzoic acid, or mixtures of the various suitable bifunctional acids or derivatives thereof and the various suitable dihydroxy compounds and derivatives thereof. The repeating structural units of the polymer chain comprise recurring divalent ester radicals separated by predominantly carbon atom chains comprising hydrocarbon radicals free of ethylenic unsaturation, halogen-substituted hydrocarbon radicals, and chalcogen-containing hydrocarbon radicals wherein each chalcogen atom is bonded to carbon or a different chalcogen atom, and no carbon is bonded to more than one chalcogen atom. Thus, the repeating units may contain ether, sulfonyl, sulfide, or carbonyl radicals. Sulfonate salt substituents may also be present in minor amount, up to about 5 mol percent total sulfonate salt substituents in the polyester based on the number of ester linking units present in the polyester. Other suitable substituents may also be present.

Among the various suitable dicarboxylic acids are terephthalic acid, bromoterephthalic acid, 4,4'-sulfonyldibenzoic acid, 4,4'-diphenyldicarboxylic acid, 4,4'-benzophenonedicarboxylic acid, 1,2 - bis(4 - carboxyphenyl)-ethane, 1,2-bis(p-carboxyphenoxy)ethane, bis-4-carboxyphenyl ether and various of the naphthalenedicarboxylic acids, especially the 1,4-, 1,5-, 2,6-, and 2,7- isomers. Isophthalic acid is also suitable, especially when used in combination with a 1,4-dihydroxyaromatic compound. Carbonic acid is similarly suitable.

Among the various suitable dihydroxy compounds are the glycols, such as ethylene glycol and other glycols taken from the series HO(CH$_2$)$_n$OH, where $n$ is 2 to 10; cis or trans-p-hexahydroxylylene glycol; diethylene glycol; quinitol; neopentylene glycol; 1,4-bis(hydroxyethyl) - benzene; and 1,4 - bis(hydroxyethoxy)benzene. Other suitable compounds include dihydroxyaromatic compounds such as 2,2-bis(4-hydroxy-3,5-dichloro-phenyl)propane, 2,2 - bis(4 - hydroxyphenyl)propane, hydroquinone, and 2,5- or 2,6-dihydroxynaphthalene.

The advantages of this invention are particularly important for polyesters prepared from diphenols. A preferred polyester type is that prepared from 2,2-bis(4-hydroxyphenyl)propane and a dicarboxylic acid.

In accordance with the present invention, the synthetic linear condensation polyester contains in the polymer molecule 0.05 to 10 mol percent of a repeating organic radical capable of absorbing ultraviolet light. In preferred embodiments of the invention, the ultraviolet absorbing organic radicals contain a 2-hydroxybenzophenone nucleus or an N-substituted arylo-2,1,3-triazole nucleus Thus, in a preferred embodiment, the synthetic linear condensation polyester contains structural units of the types 1a, 1b, and 1c below:

1a)
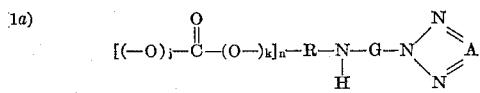

where A is an aromatic radical of the benzene or naphthalene series in which two vicinal carbon atoms are bound to the nitrogen atoms of the triazole ring; G is a divalent aryl radical having an amino group attached ortho to the triazole nitrogen; and R is an organic radical having a valence of $n+1$. R may be, for example, an aroyl radical, an acyl radical, a benzenesulfonyl radical, an aliphatic hydrocarbon radical, or a halogen-substituted hydrocarbon radical;

(1b)
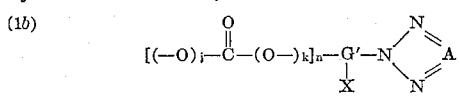

where A is an aromatic radical as in Formula 1a; G' is an aryl radical having a valence of $n+2$; X is a radical attached to G' ortho to the triazole nitrogen and is selected from the group consisting of —OH, —SH, —NH$_2$, and —NHR', where R' is an aroyl radical, an acyl radical, a benzenesulfonyl radical, an aliphatic hydrocarbon radical, or a halogen-substituted aliphatic hydrocarbon radical; or (1c)
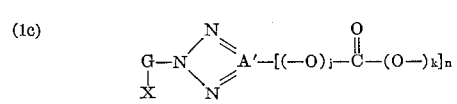

where A' is an aromatic radical of the benzene or naphthalene series having a valence of $n$ in addition to the bonds with the nitrogen atoms of the triazole ring; G is a divalent aryl radical; and X is a radical as defined in 1b.

In each of the Formulas, 1a, 1b, and 1c, $n$ may be 1 or 2; $j$ and $k$ are 0 or 1; and $j+k=1$ or 2.

It will be noted that each of the Formulas, 1a, 1b, and 1c, provides for a grouping of the following type:

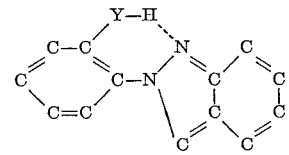

in which Y is O, S, or N, and in which the hydrogen atom attached to Y is in position to interact with a triazole nitrogen atom. It is believed that this interaction between the hydrogen atom attached to Y and the triazole nitrogen atom is essential for the protective function of these aryl-2,1,3-triazole compounds; therefore, it is apparent that the radicals R and R' should bear no substituent which would sterically hinder the interaction of a triazole introgen and the hydrogen atom attached to Y.

Ester-forming ultraviolet absorbing compounds from which the polyester units of Formulas 1a, 1b, and 1c may be derived are typified, by although not limited to, compounds of the formula:

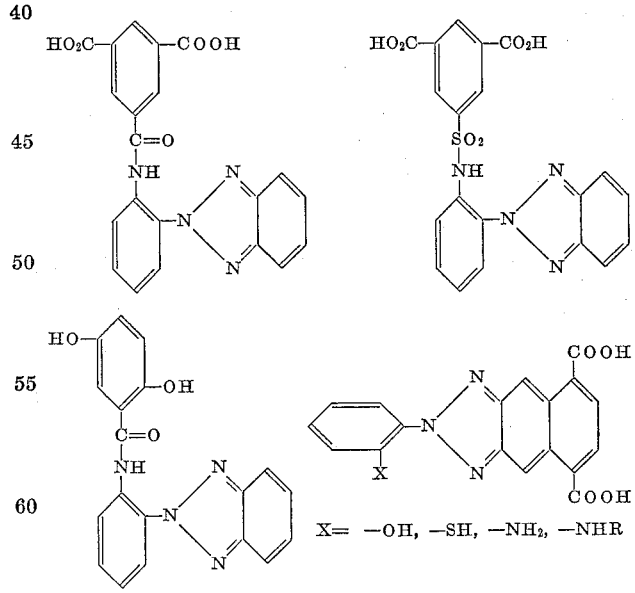

Examples of other suitable ultraviolet absorbing compounds containing the arylotriazole nucleus include
2-(2',4'-dicarboxybenzamidophenyl)-2,1,3-benzotriazole,
2-(2',4'-dihydroxybenzamidophenyl)-2,1,3-benzotriazole,
2-(2',4'-dicarboxybenzsulfonamidophenyl)-2,1,3-benzotriazole,
2-(2',4-dihydroxybenzsulfonamidophenyl)-2,1,3-benzotriazole.

Also the corresponding 2',5' and 3',5'-isomeric compounds.

In another preferred embodiment, the synthetic linear condensation polyester contains ultraviolet radiation absorbing structural units of the type (2)
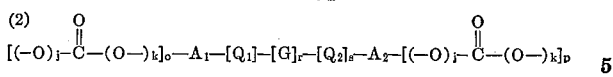

where $o$ and $p$ may be 0 or 1 and $o+p=1$ or 2; $j$ and $k$ are 0 or 1 and $j+k=1$ or 2; $r$ is 0 or 1 and $s$ is 0 or 1. $A_1$ and $A_2$ may be direct bonds or members of the class consisting of

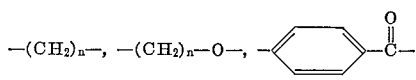

where $n$ is an integer from 1 to 10, with the proviso that when $p=0$, $A_2$ may be hydrogen; $Q_1$ and $Q_2$ are radicals of the formula:

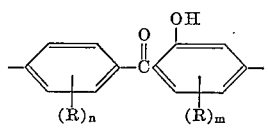

where $n$ is an integer from 0 to 4 and $m$ is an integer from 0 to 3 and R is a radical taken from the class consisting of alkyl, alkoxy, hydroxy, phenoxy, aryl, naphthaloxy, benzoyl, and halogen; and G is a direct bond or a divalent radical such as a divalent aliphatic hydrocarbon radical

isopropylidene, or the like.

Ester-forming ultraviolet absorbing compounds from which the polyester units of Formula 2 may be derived are typified by, although not limited to, compounds of the formulas:

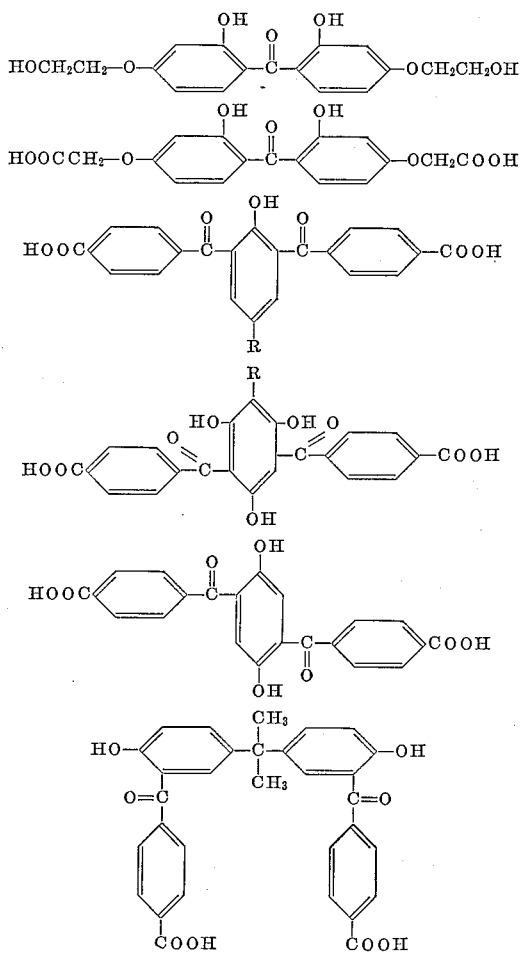

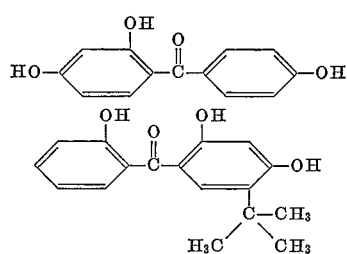

Examples of other suitable ultraviolet absorbing compounds containing the 2-hydroxybenzophenone nucleus include 2,4-dihydroxyethoxy-2'-hydroxybenzophenone, or the 2',4- isomer; and 2,4-dicarboxymethoxy-2'-hydroxybenzophenone, or the 2',4-isomer.

In one important embodiment, the polyesters of this invention may contain a sulfonate salt group attached to one or more units of the polymer chain. The sulfonate salt group may be attached to one of the major polyester linking units, or it may be attached to the ultraviolet absorbing unit. The presence of sulfonate salt groups renders the polyester dyeable with basic dyes, as disclosed in Belgium 572,649 and Belgium 562,460. Desirably, the sulfonate salt group is attached to the ultraviolet absorbing unit to give in a single unit the combined effects of dyeability and light stability without an excessive lowering of melting point which may accompany higher concentrations of copolymer components in a polyester.

The modified synthetic linear condensation polyesters of this invention may be formed into various types of shaped articles such as fibers, films, ribbons, rods, pellicles, bars, sheets, and the like. Such articles exhibit a greatly improved resistance to ultraviolet light degradation. Furthermore, this protection from ultraviolet light is found to be washfast, sublimation-fast, and not subject to removal by surface abrasion.

An additional advantage, which is particularly important for textile fibers, is the fact that the lightfastness of dyes incorporated in the stabilized polyesters is also markedly improved. Thus, dyes of poor or borderline lightfastness may be used successfully in the polyesters of this invention, giving objects having a greater range of useful color shades than was available previously.

Surprisingly, the inclusion of an ultraviolet absorbing unit in the molecular chain of the polyster is found to give a marked improvement in resistance to ultraviolet light when compared with the results obtained with an equivalent amount of a similar or identical ultraviolet absorbing compound which is coated on the surface of the article, dissolved in the polymer as by a dyeing procedure, or incorporated in casting solutions. The reasons for this unexpected improvement in ultraviolet light stability are not fully understood, but the fact of the improvement can be readily demonstrated in both laboratory tests and full-scale use tests.

The following examples are cited to illustrate the invention although they are not intended to be limitative.

The inherent viscosity of the polymer, denoted by the symbol $N_{inh}$, is used herein as a measure of the degree of polymerization of the polymer and may be defined as $$N_{inh}=\frac{ln(r)}{C}$$

wherein $r$ is the viscosity at 25° C. of a dilute solution of the polymer divided by the viscosity of the solvent measured in the same units at the same temperature; and C is the concentration in grams of the polymer per 100 ml. of solution. A concentration of about 0.5 gram of polymer per 100 ml. of solution is convenient for performing inherent viscosity determinations.

Example I

A reaction mixture is prepared containing an equal number of mols of 2,2-bis(4-hydroxyphenyl)propane diacetate and isophthalic acid, and in addition, 3 mol percent of a mixture of the isometric 2,4- and 2',4-diacetates of 2,2',4-trihydroxybenzophenone. The mixture is heated with stirring to 245° C. at atmospheric pressure in a reaction vessel immersed in a heating bath. The temperature of the bath is slowly increased as acetic acid is distilled out until a final temperature of 300° C. is reached, whereupon the pressure in the vessel is reduced slowly to a minimum of 1.0 mm. while maintaining the bath temperature at 300° C. The polymerization reaction is continued for a period of 2 hours and then the reaction vessel is cooled, causing the polymeric material to solidify. The inherent viscosity of the polymer is found to be 0.50. The melting point is 270° C. An attempt to extract trihydroxybenzophenone from polyester by treatment with a solvent is unsuccessful.

The polymer is melt spun into a yarn made up of 2 denier filaments, and the yarn is exposed to radiation from a xenon arc, which is high in ultraviolet radiation. The yarn exhibits a slight discoloration after 24 hours exposure. A control yarn prepared in a similar manner without the 2,2',4-trihydroxybenzophenone exhibits a similar discoloration after only 2 hours exposure.

Example II

Two-tenths of a mol of sodium hydroxide is dissolved in 700 parts of water. Diphenylolpropane (20.8 grams; 0.095 mol) and 0.005 mol of 2,2',4-trihydroxy-5-t-butylbenzophenone are added to the alkaline solution and dissolved. Addition of a few pellets of sodium hydroxide may be necessary to complete dissolution. Sodium lauryl sulfate, 8.4 grams, is added and dissolved. The solution is transferred to a 4-liter beaker fitted with an efficient air-driven stirrer. The solution is rapidly stirred so that the foam level rises within a few inches of the top of the beaker while a solution of isophthaloyl chloride (0.1 mol) in 250 ml. of 1,1,2-trichloroethane is added as rapidly as possible. After foaming ceases, stirring is continued for an additional 15 minutes. Acetone, 500 ml., is added to the stirred mixture to precipitate the polymer as a fine off-white powder. The powder is washed continuously with hot water to remove residual solvent and dissolved salts, and dried in vacuo over night at 120° C. The polymer is found to have an intrinsic viscosity of 0.54 in methylene chloride/trifluoroacetic acid (75/25), and a softening range of 240°–250° C.

The polymer is dissolved in methylene chloride/TFA (75/25) and cast into a clear self-supporting film. Upon exposure to a xenon arc for a period of 24 hours, the film is found to exhibit no discoloration. A similar polymer sample which does not contain the hydroxybenzophenone unit is found to exhibit a detectable discoloration after only 2 hours exposure.

Example III

A mixture of one-tenth mol of isophthalyl chloride and one-tenth mol of terephthalyl chloride is added to 0.196 mol of diphenylolpropane and 0.004 mol of 2,2',4-trihydroxybenzophenone in 800 ml. of 2,4,6-trichlorobenzene. HCl fumes are evolved while a stream of dry nitrogen is passed through the solution and sufficient heat supplied so that the temperature is 10°–15° C. below the boiling point of the solvent. Heating is maintained for 12 hours. The hot solution (80–90° C.) is poured into a large volume of dry ligroin (B.P. 90–120° C.). The precipitated polymer is further extracted with ligroin in a blendor, filtrated and washed and well dried. The polymer is found to have an inherent viscosity of 0.79 and a melting point of 290–295° C.

The polymer is dissolved in methylene chloride/trifluoroacetic acid (75/25) and spun into yarn following normal dry spinning procedures. Upon exposure to radiation from a xenon arc, the yarn is found to exhibit a noticeable discoloration after a period of 12 hours. A control yarn prepared in a similar manner but which does not contain the hydroxybenzophenone unit gives a similar discoloration after only 2 hours exposure to the xenon arc.

The yarn prepared above, along with its control, is exposed in a carbon arc Weather-Ometer for a period of 400 hours, and its tensile properties measured. The yarn containing the hydroxybenzophenone unit is found to suffer a loss in strength of 15% whereas the control yarn exhibits a loss of 40%.

Example IV

The film prepared in Example II is baked at a temperature of 180° C. under a vacuum (0.2 mm. of mercury) for a period of 0.1 hour. No loss of the hydroxybenzophenone unit by sublimation is detectable. When the film is tested for ultraviolet stability by exposure to a xenon arc, its improved stability is unimpaired.

A control film which contains 2-hydroxybenzophenone dispersed in the unmodified polyester, by virtue of dissolving the 2-hydroxybenzophenone in the solvent from which the polymer film is cast, is subjected to the same heat and vacuum tests and found to lose its hydroxybenzophenone by sublimation. When exposed to the xenon arc after being heated in a vacuum, its resistance to ultraviolet degradation is found to be reduced to that of an unmodified poly(diphenylolpropane isophthalate) film.

Example V

To a 500 ml. three-necked flask fitted with a nitrogen inlet tube, a stirrer and a distilling head, is added 2,2-bis(4-hydroxyphenyl)propane diacetate (0.15 mol; 46.85 grams), isophthtalic acid (24.42 grams) and 2(3',5'-dicarboxybenzamindo - 2 - phenyl) - 2,1,3 - benzotriazole (0.0015 mol; 0.61 gram) and 0.13 gram of anhydrous sodium acetate. The mixture is heated with stirring at 260° C. while 0.08 liter/minute of nitrogen is passed through the melt and acetic acid collected. The temperature is raised gradually to 300° C. until 14 ml. of acetic acid has been collected. At this point, the nitrogen inlet is closed off and a vacuum applied with vigorous stirring at 200° C. After 60 minutes of vacuum cycle (0.06 to 0.1 mm. Hg) the polymer viscosity is such that continued stirring cannot be maintained and the system is flushed with nitrogen and the polymer allowed to drain from the stirrer. The clear soldified polymer has an intrinsic viscosity of 0.58 in methylene chloride/trifluoroacetic acid (75/25) and can be melt pressed at 310° C. to a transparent, colorless self-supporting film. A sample of the film is exposed to radiation of a xenon arc and is found to exhibit a detectable discoloration after 12 hours.

The above experiment is repeated using 23.67 parts of isophthalic acid and 3.02 parts of 2(3',5'-dicarboxybenzamido - 2 - phenyl)2,1,3-benzotriazole. The resulting polymer, which accordingly contains 5 mol percent of benzotriazole groups based on carbonyloxy ester linkages, has an inherent viscosity of 0.47. A self-supporting film cast from a 15% solution of the polymer in methylene chloride/trifluoroacetic acid (75/25) is found to give a detectable degree of discoloration after exposure to a xenon arc for a period of 48 hours.

In a control run, the experiment is repeated again, using 24.92 parts of isophthalic acid and no 2(3',5'-dicarboxybenzamido-2-phenyl)benzotriazole. The resulting polymer, which accordingly contains no benzotriazole groups, has an inherent viscosity of 0.55. When a film cast from a 15% solution of this polymer in methylene chloride/trifluoroacetic acid (75/25) is subjected to the same xenon arc radiation described above, it exhibits a detectable degree of discoloration after only 2 hours exposure.

Example VI

A sample of yarn prepared according to the general procedure of Example III is woven into a fabric and the fabric is subjected to a series of 10 simulated home laundering-ironing cycles. The resulting fabric sample, which contains 2,2',4-trihydroxybenzophenone copolymerized in the polymer, is then exposed to a xenon arc and found to exhibit the same resistance to discoloration as an unwashed sample.

A control yarn spun from the copolyester prepared from diphenylolpropane and equal mols of isophthalic acid and terephthalic acid is woven into a fabric and treated with a 3% solution of 2,2',4-trihyldroxybenzophenone in diethylene glycol. The fabric sample is then subjected to a series of 10 launderings as above. When tested for resistance to discoloration upon exposure to a xeon arc, in comparison with an unwashed sample, a loss of more than 50% of the initial ultraviolet protection is found to have been suffered.

Example VII

A mixture of dimethyl-2,6-naphthalate (16.76 grams), 2(3',5' - dicarbomethoxybenzamindo - 2 - phenyl)benzotriazole (0.60 gram), and 8.2 ml. of ethylene glycol is heated at 195° C. for 120 minutes when distillation of methanol ceases. The ethylene glycol contains manganous acetate and antimony trioxide in catalytic amounts which act as ester exchange and polymerization catalysts. The thermometer is then replaced by a nitrogen-fed capillary inlet tube which extends to the bottom of the melt. Vacuum is applied while a thin stream of nitrogen is allowed to bubble through the mixture and the heating bath temperature is gradually raised from 190° C. to 280° C. Vacuum polymerization is continued at 280° C. for 2.5 hours. The rapidly quenched polymer of intrinsic viscosity 0.32 is ground to a fine mesh and pressed into clear self-supporting films at 285° C.

The benzotriazole modified polymer film and a control, unmodified polyethylene-2,6-naphthalate film, are exposed to xenon arc radiation. The unmodified film shows a detectable discoloration after 12 hours exposure; the modified polymer shows a detectable, but less severe discoloration, after 36 hours exposure.

Example VIII

A mixture of dihydroxyethyl-2,6-naphthalate (19.42 grams), 2,2' - dihydroxy - 4,4'-di-β-hydroxyethoxybenzophenone (0.11 gram) and antimony trioxide (0.0060 gram) are charged to a polymer tube. The mixture is melted in a bath maintained at 220° C. A nitrogen-fed capillary is inserted and a vacuum of 11 mm. applied as the temperature is raised gradually from 220° C. to 280° C. After 25 minutes, the vacuum is increased to 0.1 mm. and heating at 280° C. continued for an additional 3.0 hours. The pale-yellow melt is rapidly quenched to give a polymer which fails to dissolve in methylene chloride/trifluoroacetic acid (75/25) but from which clear pale-yellow self-supporting films may be melt pressed at 285° C. These films show no detectable color change after 24 hours exposure to a xenon arc; a control, unmodified polymer film prepared from dihydroxyethyl-2,6-naphthalate shows a detectable discoloration after 12 hours exposure.

Example IX

A polymer tube is charged with 13.98 grams of dimethyl terephthalate, 0.44 gram of sodium-3,5-dicarbomethoxybenzene sulfonate, 0.65 gram of 2(3',5'-dicarbomethoxybenzamido-2-phenyl)-2,1,3-benzotriazole and 8.8 ml. of ethylene glycol containing catalytic amounts of manganous acetate and antimony trioxide. Atmospheric exchange to remove methanol is conducted over a 90 minute period while the heating temperature is gradually raised from 200° C. to 225° C. A vacuum of 0.4 mm. is applied while the temperature is raised to 280° C. after which the vacuum cycle is continued at 280° C. for an additional 3 hours. The resulting polymer has an intrinsic of 0.41 and melts at 250–255° C.

Example X

To a 5-liter 3-necked flask fitted with a heating mantle, an efficient stirrer, a nitrogen inlet tube, and a take-off head fitted with a thermometer extending well into the flask there was charged: 3.8 mols of 2,2-bis(4-hydroxyphenyl)propane diacetate, 0.16 mol of 2,2-bis(3,5-dichloro-4-hydroxyphenyl)propane diacetate, 4.05 mols of isophthalic acid, 3.28 grams of fused sodium acetate and 600 ml. of freshly distilled inert heating solvent consisting of 73.5% phenyl ether and 26.5% diphenyl. There was also charged 0.04 mol of an isomeric mixture of the 2,4- and 2',4-diacetates of 2,2',4-trihydroxy-5-tertiary butylbenzophenone. This glassy solid which softened at 60° C. and melted around 70° C. had a saponification equivalent of 247.9 compared to the theoretical value of 250.2. Distillation of acetic acid began at a pot temperature of 240° C. and was continued for a total of 21 hours while the pot temperature was gradually raised to a maximum of 275° C. until 525 ml. of distillate boiling between 100 and 185° C. are recovered. The small stream of nitrogen was increased ten-fold at the latter stages to sweep out any residual acetic acid still in the pot. The hot liquid is then poured into glass dishes, allowed to solidify, and ground to a fine powder. Extraction of the powder with methylene chloride leaves a polymer of intrinsic viscosity 0.44 and a softening temperature of 200–210° C. Films pressed from this polymer show the same protection to xenon arc radiation obtained with the modified product of Example I.

Example XI

To an apparatus previously described in Example V there is charged 31.23 grams of 2,2-bis(4-hydroxyphenyl)-propane diacetate, 16.28 grams of isophthalic acid, 0.88 gram of 2(3',5' - dicarboxybenzsulfonamido-2-phenyl)-2,1,3-benzotriazole and 0.99 gram of fused sodium acetate. Atmospheric exchange is conducted as in Example V until 8.8 ml. of acetic acid are collected. Vacuum is applied to the system with stirring and heating at 300° C. for an additional 40 minutes. The resulting polymer has an intrinsic viscosity of 0.35 and a polymer melting temperature of 285° C. Self-supporting films pressed from this polymer at 310° C. show no discoloration until they have been exposed to a xenon arc for 12 hours. A control polymer film of unmodified poly(diphenylolpropane isophthalate) shows an equivalent discoloration after only 2 hours exposure to the same radiation.

Example XII

The procedure of Example V is repeated in all respects except that 0.27 gram of 2,2'-dihydroxy-4,4'-dicarboxymethoxybenzophenone is used in place of the benzotriazole compound. The resulting clear polymer has an intrinsic viscosity of 0.52 and may be melt pressed into clear, tough, self-supporting films at 310° C. Exposure of these films to a xenon arc results in a visible discoloration after 6 hours exposure; a control, unmodified film shows the same degree of discoloration after 2 hours exposure.

Example XIII

A flask fitted with a nitrogen inlet tube, a stirrer, and a steam-jacketed distilling head is charged with 0.10 mol of diphenyl isophthalate, 0.095 mol of 2,2-bis(4-hydroxyphenyl)propane, 0.004 mol of 2,2-bis(4-hydroxy-3,5-dichlorophenyl)propane, 0.001 mol of 2,4,4'-trihydroxybenzophenone, and 0.033 gram of fused sodium acetate. The bath is heated at 250° C. and raised in temperature to 275° C. over a one-hour period until 13.5 ml. of phenol (75% of theoretical) are collected. The pale-yellow "prepolymer" obtained is ground to a fine powder and has an intrinsic viscosity of 0.14 in methylene chloride/trifluoroacetic acid (75/25).

The powdered prepolymer is melted in a hopper at

280° C. and the melt deposited as a 1 mil. film onto a moving aluminum tape. The tape is advanced into a polymerization chamber heated at 350° C. and swept by a stream of nitrogen preheated to 360° C. The residence time of the tape in the polymerization chamber is 90 seconds. The aluminum tape is destroyed by dissolution in mineral acid or alkali to leave a pale-yellow, self-supporting film of terpolymer composition essentially identical with the initial concentration charged as prepolymer. The film has an intrinsic viscosity of 0.35. Although pale-yellow in color, it shows no further discoloration when exposed to xenon arc radiation until 12 hours exposure time. A control film which does not contain the trihydroxybenzophenone shows the same degree of discoloration after only 3 hours exposure to a xenon arc.

*Example XIV*

A polyester is prepared from diphenylopropane, isophthalic acid, and 4 mol percent of 2-[3',5'-dicarboxybenzamido-2-phenyl]-2,1,3-benzotriazole. The polymer is melt pressed into a self-supporting film and the film is dyed to a deep blue with Anthraquinone Milling Blue BL (C.I. 50310). The film is exposed in a standard Fade-Ometer along with a control sample which does not contain the benzotriazole unit, with the results shown in the following table. Fade-Ometer ratings are on a 1 to 5 scale, where 5 indicates no detectable "break" in color and decreasing numbers from 5 to 1 indicate "breaks" of increasing severity. The improved performance of the polyester of this invention is obvious from the data.

| Sample | Fade-Ometer Rating for Indicated Exposure Hours | | |
|---|---|---|---|
| | 20 | 25 | 30 |
| Test | 5 | 5-4 | 5-4 |
| Control | 4 | 4-3 | 3-2 |

*Example XV*

2-(o-aminophenyl)-2,1,3-benzotriazole is sulfonated by treating for 10 minutes with 20% fuming sulfuric acid on a steam bath, and then neutralizing the mixture with 20% aqueous sodium hydroxide. The crystalline monosodium sulfonate derivative obtained is then treated in the presence of an acid acceptor with 3,5-dicarbomethoxy benzoyl chloride to give the amidated diester derivative, which is used in the preparation of the polyesters of Examples XVI, XVII, and XVIII.

*Example XVI*

The sulfonated amido-diester of Example XV is saponified and acidified with strong mineral acid. The precipitated triacid is then treated with one equivalent of sodium acetate in alcohol to give the sodium sulfonate amido-dicarboxylic acid derivative. Two mol percent of this derivative is then incorporated in a polyester prepared from 2,2-bis(4-hydroxyphenyl)propane diacetate and isophthalic acid according to the procedure of Example V. The polymeric product is found to have an intrinsic viscosity of 0.37. The polymer is melt pressed at 325° C. to a clear self-supporting film which is found to be dyeable with the basic dyes Brilliant Green (C.I. 42040) and Brilliant Red 4G (C.I. Basic Red 14). A sample of the undyed film is exposed to the radiation of a xenon arc and found to exhibit a detectable discoloration after 12 hours exposure. A control film prepared from the homopolymer of 2,2-bis(4-hydroxyphenyl)propane and isophthalic acid shows a detectable discoloration after only 2 hours exposure.

*Example XVII*

One mol percent of the amidated diester derivative of Example XV is incorporated in polyethylene terephthalate following the general procedure of Example IX, with the exception that no sodium-3,5-dicarbomethoxybenzene sulfonate is present. The resulting polymer is found to have an intrinsic viscosity of 0.63 and a polymer melting temperature of 235° C. The polymer is melt pressed into clear, tough, self-supporting films which are found to be resistant to ultraviolet degradation as well as dyeable with the basic dyes used in Example XVI.

*Example XVIII*

The procedure of Example VII is repeated substituting 1.0 mol percent of the amidated diester derivative of Example XV for the 2(3',5'-dicarbomethoxybenzamido-2-phenyl)-2,1,3-benzotriazole. The polymeric product produced is melt pressed into a thin self-supporting film which is found to be dyeable with the basic dyes Brilliant Green and "Sevron" Brilliant Red 4G, and which exhibits improved resistance to ultraviolet degradation in comparison with a control film pressed from the homopolymer, poly(ethylene-2,6-naphthalate).

It will usually be desirable to use at least about 0.5 mol percent of the ultraviolet absorbing additive, based on the ratio of ultraviolet absorbing groups to ester linkages in the final polymer. Polymers having a 2-hydroxybenzophenone or benzotriazole content of appreciably less than 0.5 mol percent will usually have only a relatively low resistance to ultraviolet degradation, approximating that of the unmodified polyester. Polymers containing about 10 mol percent of the ultraviolet absorbing additive have a very high resistance to ultraviolet degradation. Higher concentrations will not in general lead to appreciable increases in resistance to ultraviolet degradation and may lower the melting point of the polymer prohibitively. It will be realized that the monofunctional ester-forming derivatives act as chain terminators in the condensation reaction and will tend to lower the molecular weight of the polymer. Difunctional ester-forming derivatives will usually be selected when polymers of especially high molecular weight are desired. In some instances, it may be desirable to mix two or more different types of ultraviolet absorbing units, in which case the sum of the concentrations of such units should fall in the range 0.5 to 10 mole percent.

Various other materials may be present in the reaction mixture. For example, polymerization catalysts, color inhibitors, pigments, delusterants, or other additives may be present.

Filaments and films, i.e., shaped structures which have at least one dimension relatively very small and at least one dimension relatively large, are the preferred structures of the present invention. Yarns produced in accordance with the present invention are suitable for the usual textile applications. They may be employed in the knitting or weaving of fabrics of all types as well as in the production of nonwoven or felt-like products produced by known methods. Their physical properties closely parallel those of their related polyester fibers. But more importantly, they have enhanced resistance to ultraviolet degradation, especially discoloration resulting from ultraviolet exposure, and they offer improved dye lightfastness performance.

It will be apparent that many widely different embodiments of this invention may be made without departing from the spirit and scope thereof, and therefore it is not intended to be limited except as indicated in the appended claims.

What is claimed is:

1. In the condensation polymerization of bifunctional ester-forming monomers which are free from ethylenic unsaturation to prepare a synthetic linear fiber-forming polyester, the method of providing enhanced resistance to photodegradation which comprises reacting and polycondensing said monomers with 0.1 to 10 mol percent, based on the number of ester linkages present in the fiber-forming polyester, of an ester-forming compound which exhibits a strong absorption of electromagnetic radiation having a wave-length in the range of 290 to 390 millimicrons and no significant absorption of radiations in the range of 400 to 800 millimicrons, said ester-forming compound being free from ethylenic unsaturation and selected from the class consisting of 2,2',4- and 2,4,4'-trihydroxybenzophenones having said three hydroxy groups as the only ester-forming groups, 2-(dicarboxybenzamidophenyl)-2,1,3-benzotriazoles, 2 - (dihydroxybenzamidophenyl)-2,1,3-benzotriazoles, 2 - (dicarboxybenzsulfonamidophenyl)-2,1,3-benzotriazoles, 2 - (dihydroxybenzsulfonamidophenyl)-2,1,3-benzotriazoles, 2(2-hydroxyphenyl)-naphtho[2,3-d]triazole-5,8 - dicarboxylic acid, 2(2-mercaptophenyl)-naphtho[2,3-d]-triazole-5,8-dicarboxylic acid, and 2(2-aminophenyl)-naphtho[2,3-d]triazole-5,8-dicarboxylic acid.

2. A synthetic linear fiber-forming condensation polyester, of bifunctional ester-forming monomers which are free from ethylenic unsaturation modified with 0.1 to 10 mol percent, based on the number of ester linkages present in the polyester chain, of a diester of a trihydroxybenzophenone having said ester groups present as an integral part of said polyester chain, said trihydroxybenzophenone being a 2,2',4-trihydroxybenzophenone having the three hydroxy groups as the only ester-forming groups.

3. A synthetic linear fiber-forming condensation polyester, of bifunctional ester-forming monomers which are free from ethylenic unsaturation modified with 0.1 to 10 mol percent, based on the number of ester linkages present in the polyester chain, of a 2-benzamidophenyl-2,1,3-benzotriazole having ester substituents on the benzamido group which are present as an integral part of said polyester chain.

4. A synthetic linear fiber-forming condensation polyester, of bifunctional ester-forming monomers which are free from ethylenic unsaturation modified with 0.1 to 10 mol percent, based on the number of ester linkages present in the polyester chain, of a 2-benzsulfonamidophenyl-2,1,3-benzotriazole having ester substituents on the benzsulfonamido group which are present as an integral part of said polyester chain.

References Cited by the Examiner
UNITED STATES PATENTS

| | | | |
|---|---|---|---|
| 2,773,778 | 12/1956 | Hoch et al. | 260—45.95 |
| 2,819,247 | 1/1958 | Lundberg | 260—75 |
| 2,962,533 | 11/1960 | Hardy et al. | 260—45.95 |
| 2,976,259 | 3/1961 | Hardy et al. | 260—45.95 |
| 3,049,503 | 8/1962 | Milionis et al. | 260—45.95 |
| 3,072,585 | 1/1963 | Milionis et al. | 260—22 |
| 3,086,988 | 4/1963 | Gordon | 260—45.95 |
| 3,094,506 | 6/1963 | Weinberg et al. | 260—45.95 |
| 3,105,094 | 9/1963 | Hoeschele | 260—45.95 |
| 3,200,086 | 8/1965 | Coleman | 260—47 |
| 3,226,358 | 12/1965 | Smith et al. | 260—45.95 |

LEON J. BERCOVITZ, *Primary Examiner.*

R. W. GRIFFIN, *Assistant Examiner.*